US007003916B2

(12) United States Patent
Nestell et al.

(10) Patent No.: US 7,003,916 B2
(45) Date of Patent: Feb. 28, 2006

(54) HORIZONTAL SLIDER WINDOW ASSEMBLY

(75) Inventors: David E. Nestell, Sprink Lake, MI (US); Darin J. Snider, Holland, MI (US); Loren Brent Renkema, Wyoming, MI (US); Jim Galer, Hudsonville, MI (US)

(73) Assignee: Donnelly Corporation, Holland, MI (US)

( * ) Notice: Subject to any disclaimer, the term of this patent is extended or adjusted under 35 U.S.C. 154(b) by 62 days.

(21) Appl. No.: 10/113,056

(22) Filed: Apr. 1, 2002

(65) Prior Publication Data

US 2003/0182866 A1 Oct. 2, 2003

(51) Int. Cl.
*E06B 3/46* (2006.01)
*E05D 15/06* (2006.01)

(52) U.S. Cl. .......................... 49/413; 49/125; 49/380

(58) Field of Classification Search ................. 49/125, 49/61, 63, 408, 413, 121, 380
See application file for complete search history.

(56) References Cited

U.S. PATENT DOCUMENTS 3,237,250 A 3/1966 Scoville ........................ 20/52
3,893,260 A 7/1975 Cadiou ........................ 49/362
4,081,926 A 4/1978 Jardin ........................ 49/210
4,124,054 A * 11/1978 Spretnjak ..................... 160/90
4,158,270 A 6/1979 Cherbourg et al. ........... 49/103
4,171,594 A 10/1979 Colanzi ....................... 49/349
4,635,398 A 1/1987 Nakamura ................... 49/413
4,674,231 A 6/1987 Radek et al. ................ 49/118
4,738,052 A 4/1988 Yoshida ........................ 49/31
4,785,583 A * 11/1988 Kawagoe et al. ............ 49/404
4,920,698 A 5/1990 Friese et al. ................. 49/380
4,934,098 A * 6/1990 Prouteau et al. .............. 49/214
4,970,911 A 11/1990 Ujihara et al. ............. 74/501.5
4,995,195 A 2/1991 Olberding et al. ............ 49/118
5,046,283 A 9/1991 Compeau et al. ............. 49/138
5,146,712 A 9/1992 Hlavaty ....................... 49/118
5,228,740 A * 7/1993 Saltzman ................. 296/146.1
5,245,788 A 9/1993 Riegelman .................. 49/465
5,294,168 A * 3/1994 Kronbetter ............. 296/146.16
5,333,411 A 8/1994 Tschirschwitz et al. ....... 49/352
5,345,717 A 9/1994 Mori et al. .................. 49/404
5,442,880 A * 8/1995 Gipson ........................ 49/413
5,467,560 A * 11/1995 Camp et al. ................. 49/413
5,473,840 A * 12/1995 Gillen et al. ................. 49/380
5,505,023 A 4/1996 Gillen et al. ................. 49/380
5,522,191 A 6/1996 Wenner et al. ........... 52/204.51
5,531,046 A 7/1996 Kollar et al. ................ 49/360
5,542,214 A 8/1996 Buening ...................... 49/380
5,613,323 A 3/1997 Buening ...................... 49/380
5,711,112 A 1/1998 Barten et al. ................ 49/118

(Continued)

FOREIGN PATENT DOCUMENTS

FR 709660 8/1931

(Continued)

*Primary Examiner*—Gregory J. Strimbu
(74) *Attorney, Agent, or Firm*—Van Dyke, Gardner, Linn & Burkhart, LLP

(57) ABSTRACT

A vehicular rear window assembly for a vehicle comprises a first fixed pane, a second fixed pane, and a sliding pane, which is supported for horizontal movement between open and closed positions. The window assembly includes a support system with an upper horizontal member, a lower horizontal member, and a pair of spaced apart vertical members, which interconnect the upper horizontal member and the lower horizontal member to define a central opening. The fixed panes adhesively mount to the upper and lower horizontal members. The vertical members have exposed exterior surfaces that are preferably generally flush with the exterior surface of the fixed panes.

26 Claims, 8 Drawing Sheets

U.S. PATENT DOCUMENTS

| | | | | |
|---|---|---|---|---|
| 5,724,769 | A | 3/1998 | Cripe et al. | 49/360 |
| 5,784,833 | A | 7/1998 | Sponable et al. | 49/360 |
| 5,799,444 | A * | 9/1998 | Freimark et al. | 49/413 |
| 5,799,449 | A * | 9/1998 | Lyons et al. | 52/204.51 |
| 5,822,922 | A | 10/1998 | Grumm et al. | 49/360 |
| 5,953,887 | A | 9/1999 | Lucas et al. | 53/534 |
| 5,996,284 | A | 12/1999 | Freimark et al. | 49/209 |
| 6,014,840 | A | 1/2000 | Ray et al. | 49/413 |
| 6,026,611 | A | 2/2000 | Ralston et al. | 49/123 |
| 6,112,462 | A | 9/2000 | Kolar | 49/121 |
| 6,119,401 | A | 9/2000 | Lin et al. | 49/361 |
| 6,119,402 | A | 9/2000 | Wisner | 49/362 |
| 6,125,585 | A | 10/2000 | Koneval et al. | 49/349 |
| 6,591,552 | B1 * | 7/2003 | Rasmussen | 49/413 |

FOREIGN PATENT DOCUMENTS

| | | |
|---|---|---|
| FR | 1199868 | 12/1959 |

* cited by examiner

HORIZONTAL SLIDER WINDOW ASSEMBLY

TECHNICAL FIELD AND BACKGROUND OF THE INVENTION

The present invention relates to a window assembly and, more particularly, to a rear window assembly with a horizontal sliding pane, such as for use as a rear window in a light truck, such as a pick-up truck.

The prior art includes window assemblies that incorporate full-circumference frames, which provide support to the pane or panes. For example, in sliding window assemblies, such as disclosed in U.S. Pat. No. 5,522,191, full-circumference frames are adhered to the fixed panes, with runners provided therein for supporting the sliding pane. In the '191 patent disclosure, the full-circumference frame forms an unbroken, continuous ring of molded plastic material about the outer perimeter of the assembly. Weather sealing is enhanced by a radially outward extending seal member that is unitary with the main body of the frame member and extends radially outward from the frame to the adjacent side wall of the vehicle body panel. Such a continuous one-piece frame facilitates the mounting and sealing of the window assembly of the '191 patent within a window recess provided by the sheet metal of the surrounding vehicle body panels. In addition, the full-circumference frame in '191 patent supports the fixed pane by adhesive surface bonding to the perimeter portion of the pane's interior surface only to obtain a flush appearance.

Full-circumference frames, however, may have relatively tight tolerances and are, therefore, potentially costly to manufacture. In addition, such frames typically must be customized to follow the shape, such as the outer periphery, of the window panes. Furthermore, a full-circumference frame requires a relatively large volume of plastic to form the frame, also increasing the cost of the frame, as well as the weight of the frame.

Consequently, there is a need for a support system that can integrate one or more fixed panes and a sliding pane or panes of a sliding window assembly into a unit without the need for a full-circumference frame or the like to ease manufacture while providing a window assembly that is easy to install and handle and, further, to minimize the weight and the cost of the assembly while still achieving, such as, the flush mounting arrangement currently popular with vehicle manufactures. Furthermore, it is desirable that the support system has greater versatility to accommodate a greater range of window sizes and shapes to minimize the need for customized frames.

SUMMARY OF THE INVENTION

Accordingly, the present invention provides a support system that integrates one or more fixed panes and one or more sliding panes into a window assembly unit, which is suitable for use as a rear window in, for example, a light truck, such as a pick-up truck. The support system is formed using less plastic and requires less stringent tolerances than heretofore known while providing sufficient rigidity to the components of the window assembly to form a window assembly unit that is relatively easy handle and, further, less costly to manufacture.

In one form of the invention, a slider window assembly includes first and second fixed panes, a support system, and a sliding pane, which is movable between open and closed positions. The support system includes upper and lower horizontal members and a pair of spaced apart vertical members, which interconnect the horizontal members and define an opening. The fixed panes are preferably adhesively mounted to the upper and lower horizontal members, and preferably form a generally flush window assembly. The vertical members have exposed exterior surfaces that are preferably substantially flush with the exterior surfaces of the respective fixed panes.

In one aspect, the upper and lower horizontal members include upper and lower tracks to support the sliding pane for movement between its open and closed positions.

In another aspect, the sliding pane is manually slidable between its open and closed positions.

In further aspects, the upper and lower horizontal members and the vertical members comprise a generally H-shaped molded plastic support element. Furthermore, at least one of the horizontal members includes a channel-shaped member at least partially (preferably substantially) encapsulated in the plastic for defining one of the upper and lower tracks for the sliding pane. In further aspects, both horizontal members include tracks.

In yet other aspects, at least one of the vertical members each includes a reinforcement member encapsulated therein, and, more preferably, both vertical members include reinforcement members encapsulated therein.

According to yet another aspect, each horizontal member includes an extended flange. The extended flange of the upper horizontal member extends above the sliding pane between the fixed panes, while the extended flange of the lower horizontal member extends below the sliding pane between the fixed panes to thereby form a generally flush window assembly. In a further aspect, each of the extended flanges includes a raised peripheral portion which generally aligns with the exterior surface of the vertical members to thereby form a framed central portion.

In other aspects, the upper and lower horizontal members are spaced inwardly from the upper and lower peripheral edges of the fixed panes. Furthermore, the distal ends of the upper and lower horizontal members are spaced inwardly from side end peripheral edges of the fixed panes.

According to another form of the invention, a support system for a window assembly includes an upper horizontal member, a lower horizontal member, and a pair of vertical members, which interconnect the upper and lower horizontal members. The horizontal members and the vertical members comprise a generally H-shaped support element molded from a plastic material, which supports a pair of fixed panes. The upper and lower horizontal members include upper and lower tracks for receiving a sliding pane for opening and closing an opening which is defined between the vertical members. Furthermore, each of the vertical members has an exterior surface for aligning substantially flush with the exterior surfaces of the fixed panes to form a generally flush window assembly.

Accordingly, the present invention provides a window assembly with a support system that integrates one or more fixed panes with one or more sliding panes to form a window assembly unit that can be readily installed in an opening in a vehicle body. The support system provides a simplified arrangement that is versatile and can be more easily manufactured; thus, saving time and costs.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
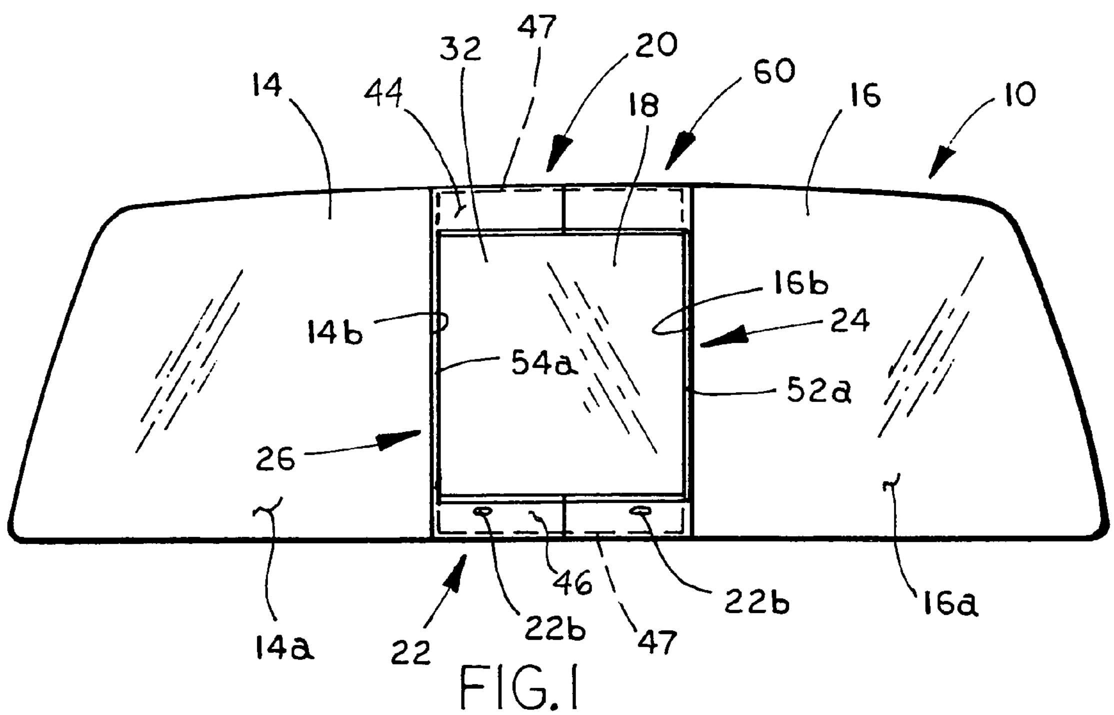
FIG. 1 is a front elevation view of a horizontal slider window assembly of the present invention.
Figure 2:
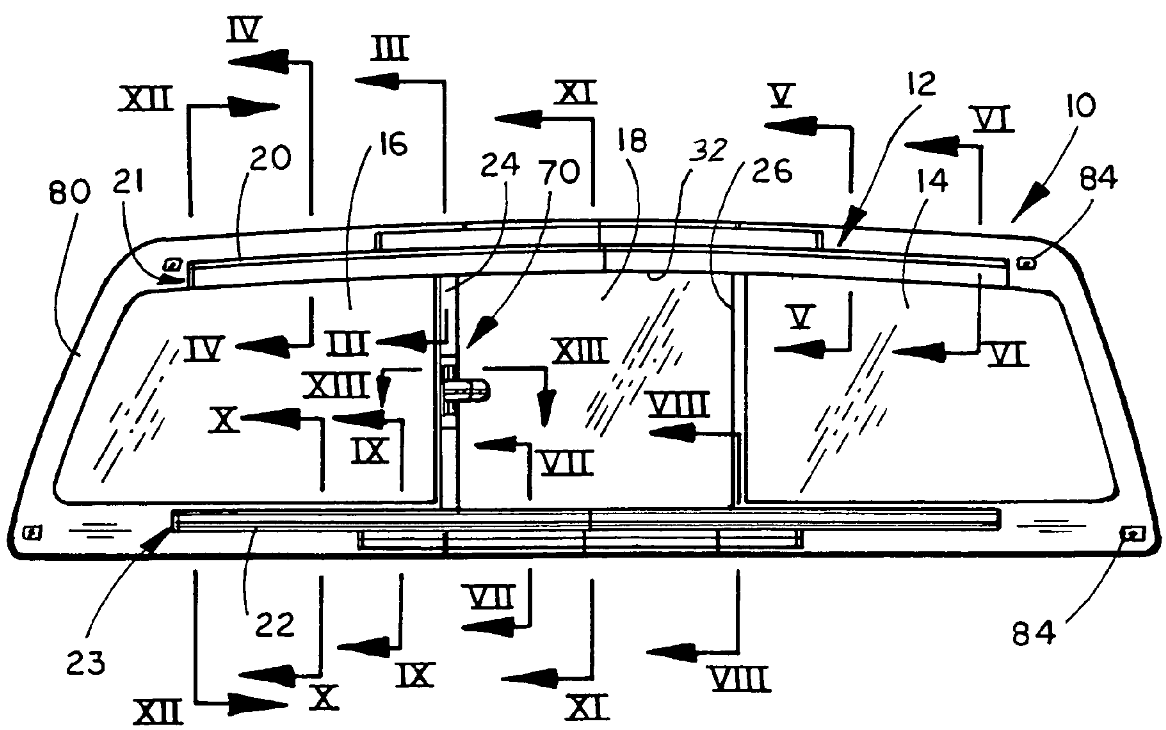
FIG. 2 is a rear elevation view of the window assembly of FIG. 1.
Figure 3:
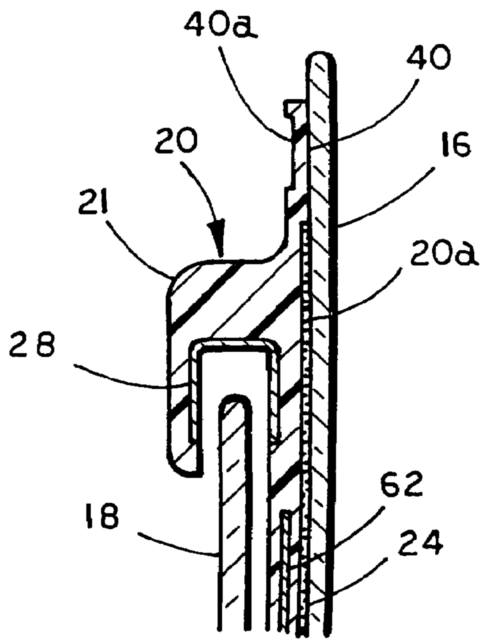
FIG. 3 is a cross-section view taken along line III—III of FIG. 2.
Figure 4:
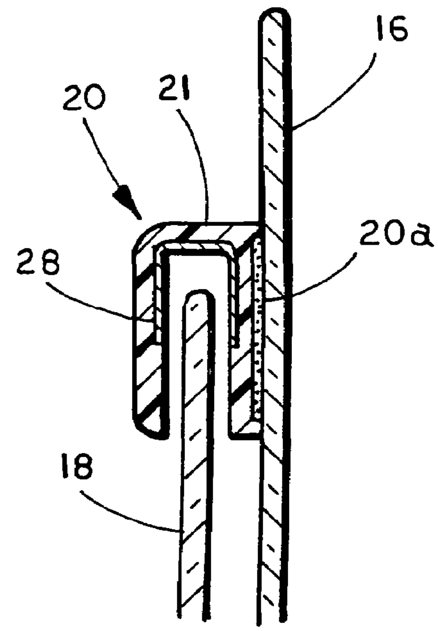
FIG. 4 is a cross-section view taken along line IV—IV of FIG. 2.

Referring to FIGS. 1 and 2, the numeral 10 generally designates a rear horizontal slider window assembly of the present invention, which is particularly suitable for use as a rear window or backlite of a vehicle, such as a light truck, including a pick-up truck or the like. Horizontal slider window assembly 10 incorporates a support system 12 that integrates one or more fixed panes with one or more sliding panes as a window assembly unit so that the window assembly can be manufactured at a window assembly plant that is located remotely from a vehicle assembly plant. Furthermore, since the window assembly is supplied as a unit, it can be handled more easily, especially during installation at the vehicle assembly plant, where the window assembly unit is mounted in an opening or recess in the vehicle body (such as the rear window opening). In addition, support system 12 provides a more versatile support system that can be mounted to different window shapes and sizes and, further, preferably provides a generally flush mounting of window assembly 10 in the vehicle body.

In the illustrated embodiment, window assembly 10 includes a first fixed pane 14, a second fixed pane 16, and one or more sliding panes 18. Panes 14, 16, and 18 preferably comprise transparent or tinted tempered glass panes; however, it should be understood that panes 14, 16, or 18 may comprise plastic panes, including transparent or tinted plastic panes. As will be more fully described below, support system 12 provides sufficient rigidity and support to fixed panes 14 and 16 and to sliding pane 18 so that assembly 10 can be mounted in an opening of a vehicle as a unit while eliminating the need for a full-circumference frame.

Referring to FIG. 2, support system 12 includes an upper horizontal member 20 and a lower horizontal member 22 that are spaced apart but interconnected by vertical members 24 and 26. Vertical members 24 and 26 together with the central portions of upper and lower horizontal members 20, 22 form an opening 32, which defines the central opening of the window assembly 10, and over which sliding pane 18 is moved when moved to its closed position.

Figure 5:
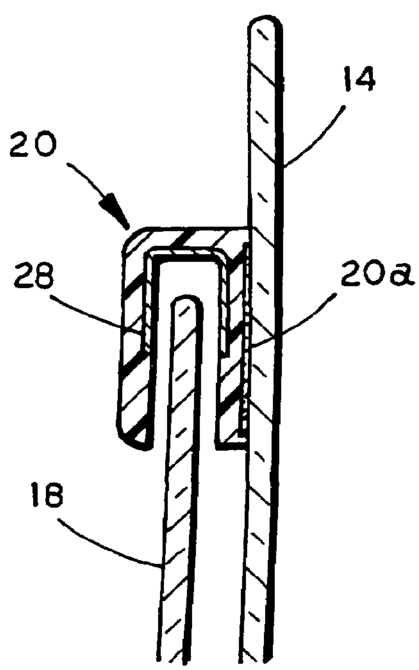
FIG. 5 is a cross-section view of V—V of FIG. 2.
Figure 6:
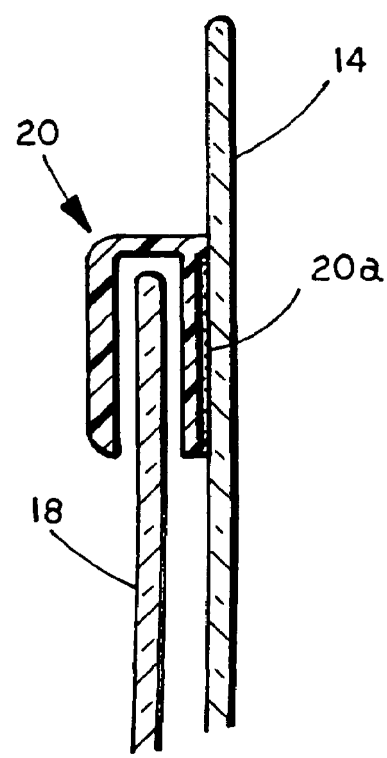
FIG. 6 is a cross-section view of VI—VI of FIG. 2.
Figure 7:
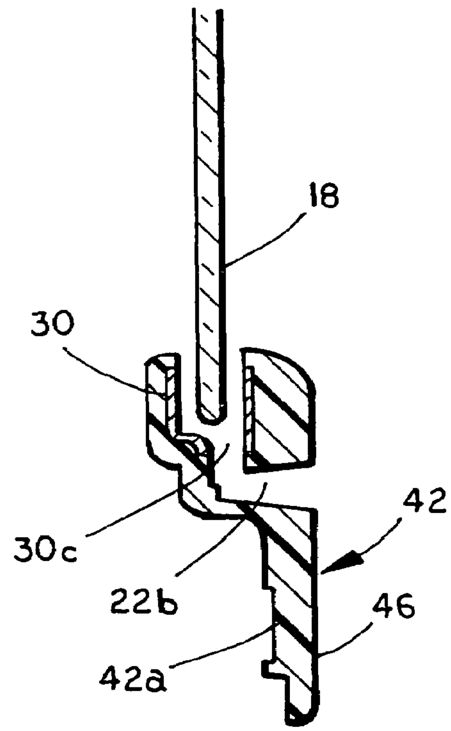
FIG. 7 is a cross-section view of VII—VII of FIG. 2.
Figure 8:
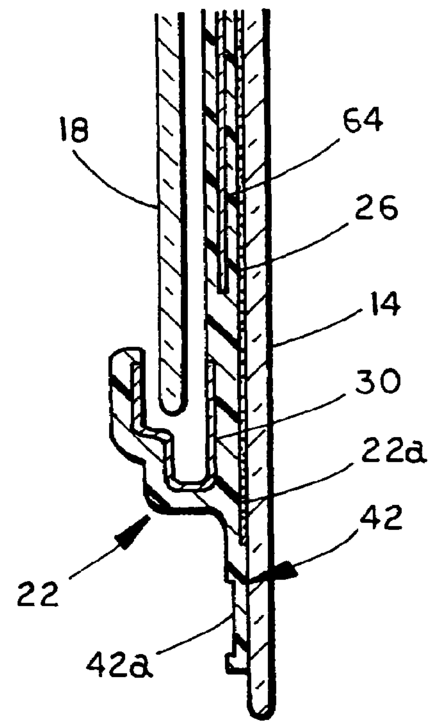
FIG. 8 is a cross-section view of VIII—VIII of FIG. 2.
Figure 9:
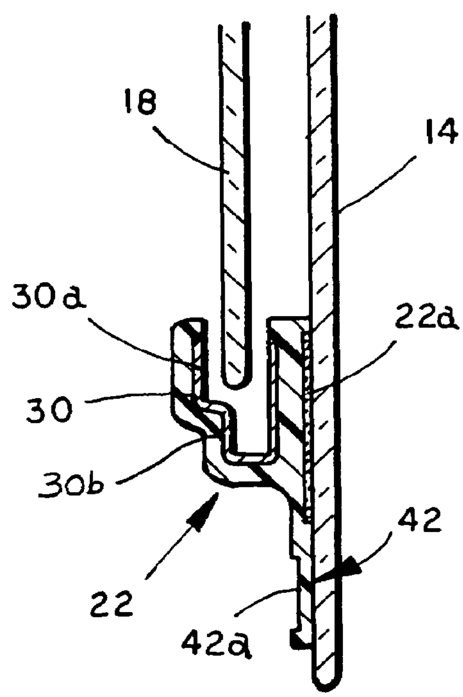
FIG. 9 is a cross-section view of IX—IX of FIG. 2.
Figure 10:
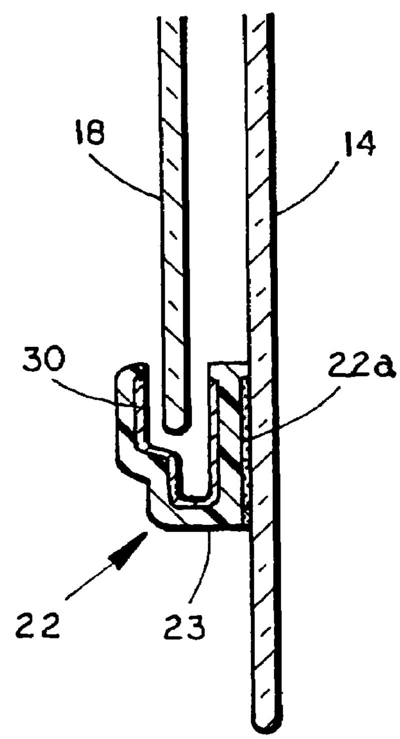
FIG. 10 is a cross-section view of X—X of FIG. 2.
Figure 11:
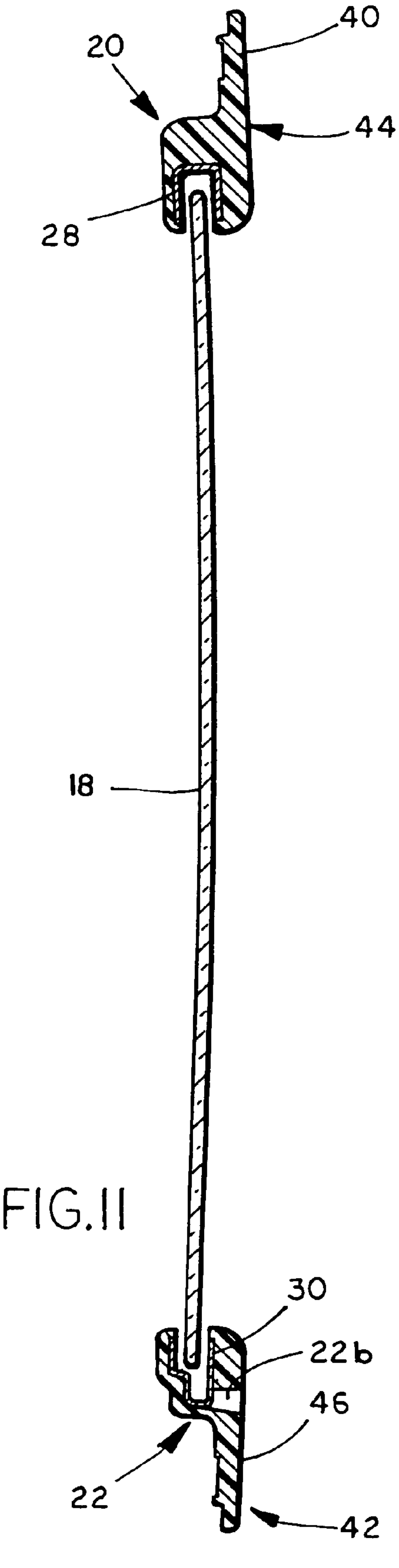
FIG. 11 is a cross-section view of XI—XI of FIG. 2.
Figure 12:
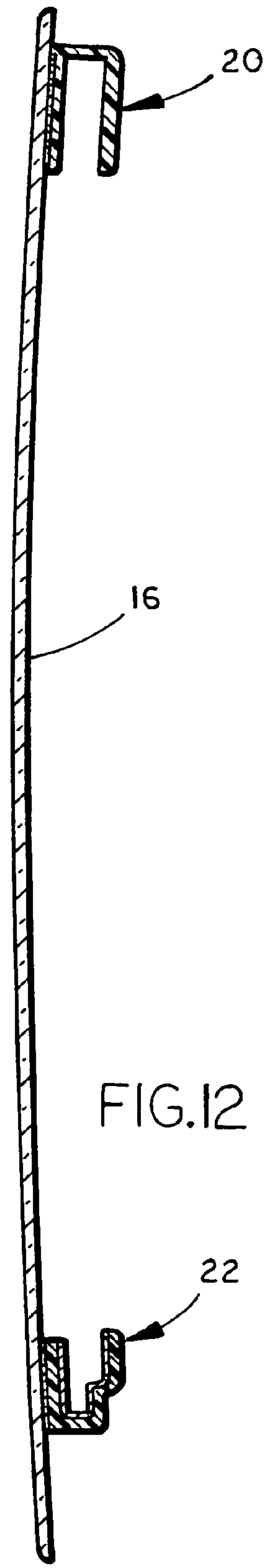
FIG. 12 is a cross-section taken along line XII—XII of FIG. 2.
Figure 13:
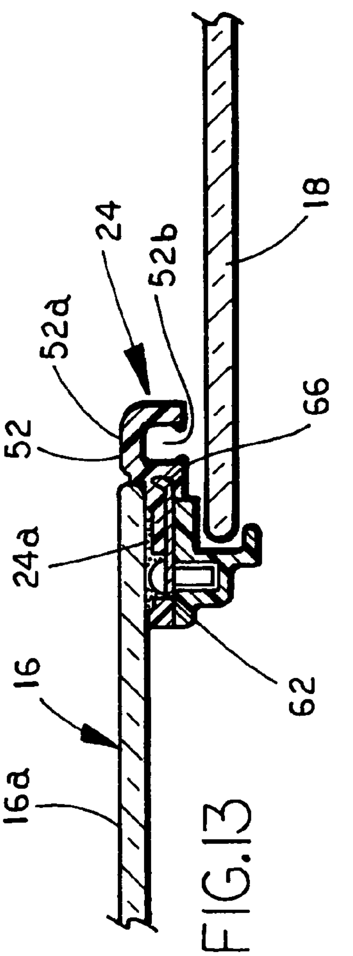
FIG. 13 is an enlarged cross-section view taken along line XIII—XIII of FIG. 2.

Support system 12 is preferably formed by integrally molding, such as by injection molding, a plastic material (such as a thermoplastic or thermoset material) about one or more rails or channel members, with the channel member(s) being preferably formed in a separate forming operation and being placed in the molding apparatus as a preformed entity. Suitable plastics include thermosetting polyurethanes. Such thermosetting polyurethanes preferably include, for example, a reaction injection molding polyurethane, a polyethylene terephthalate (PET), polypropylene, nylon, including a reinforced nylon, acrylonitrile-butadeine-styrene (ABS), or polycarbonate/polybutylene terephthalate (PC/PBT) or thermoplastic urethane (TPU). However, support 12 may comprise another formable rigid material, including metal or a composite material, such as a reinforced plastic, without affecting the scope of the present invention. Upper and lower horizontal members 20 and 22 comprise a pair of rails 28 and 30, such as channel-shaped members (FIGS. 5 and 8), preferably metal channel-shaped members, that are at least partially (and more preferable substantially) encased/encapsulated in the plastic material noted above. Rails 28 and 30 are oriented such that their open sections are facing towards each other to form or provide upper and lower tracks, which receive sliding pane 18. Preferably rails 28 and 30 comprise extruded aluminum rails; however, it can be appreciated that rails 28 and 30 may comprise rolled metal rails. Optionally, the rails may comprise and/or be formed by a plastic material or a composite material, such as a reinforced plastic or the like. In addition, rails 28 and 30 may be formed by "rolltrusion" in which the base of the rail is rolled from a metal with a polymer extruded onto the base to form, for example, a seal. Alternately, support system 12 may be formed from metal components, such as lightweight metal components, such as aluminum components.

In the illustrated embodiment, lower channel-shaped member 30 includes an enlarged upper section 30*a*, which receives the lower edge of sliding pane 18, and a lower section 30*b*, which provides a trough to collect water that may have entered into lower horizontal member 22. In order to channel or guide water out of lower horizontal member 22, lower portion 30*b* of channel-shaped member 30 includes one or more openings 30*c*, which communicate with a transverse passage 22*b* formed in member 22 that exits and directs water through exterior surface 46 of member 22.

Fixed panes 14 and 16 are mounted to horizontal members 20 and 22 on either side of vertical members 24 and 26 preferably by an adhesive. Suitable adhesives include an epoxy adhesive, a silicone adhesive, a urethane adhesive, including a one-part and more preferable a two-part urethane adhesive, an acrylic adhesive, and a polyvinylbutyral adhesive, or the like. Fixed panes 14 and 16 are shown generally in the shape of a generally trapezoidal shaped pane and include upper, outer, lower and inner peripheral edges, which are preferably substantially free of attachment to support system 12 so that window assembly 10 has an appearance of "floating" in the vehicle body opening. Furthermore, the outer or end peripheral portions of the inner surface of fixed panes 14 and 16 are substantially free of attachment to support system 12. Referring to FIG. 2, the distal ends of horizontal members 20 and 22 are preferably spaced inwardly from the outer edges of fixed panes 14 and 16. However, it can be appreciated that, depending on the size and shape of fixed panes 14 and 16, the distance may vary, therein providing a more versatile support system. Alternately, fixed panes 14 and 16 may be substantially rectangular-shaped or triangular-shaped, or other shape depending on the application, without affecting the scope of the present invention. For further details of suitable adhesives, and primer materials, which may be employed to enhance the bond between panes 14 and 16 and support system 12, reference is made to U.S. Pat. Nos. 5,853,895; 5,822,932; 6,293,609; 6,319,344; 6,068,719; 6,086,138; 6,089,646; 5,864,996; 5,707,473; 5,635,281; 5,544,458; 5,591,528; 5,611,180; and 5,807,515 all of which are commonly owned by Donnelly Corporation of Holland, Mich. and are herein incorporated by reference in their entireties.

Referring to FIGS. 3–12, upper and lower horizontal members 20 and 22, respectively, generally comprise channel-shaped members 21 and 23 and include mounting surfaces 20*a*, 22*a*, respectively, on one side, which are preferably recessed to receive the adhesive for mounting fixed panes 14 and 16 to upper and lower horizontal members 20, 22. In addition, upper and lower horizontal members 20, 22 include vertically extended flanges 40, 42 that extend above and below members 21 and 23, respectively, and between fixed panes 14 and 16 to form decorative exterior surfaces 44 and 46 as shown in FIG. 1. As best seen in FIG. 1, exterior surfaces 44 and 46 are generally flush with the exterior surfaces of vertical members 24 and 26, which together surround and frame central opening 32. In addition, as best seen in FIGS. 3 and 7–9, flanges 40 and 42 have recessed mounting surfaces 40*a* and 42*a* for receiving the adhesive, such as the adhesives noted above and below, for mounting window assembly to the vehicle body.

Figure 14:
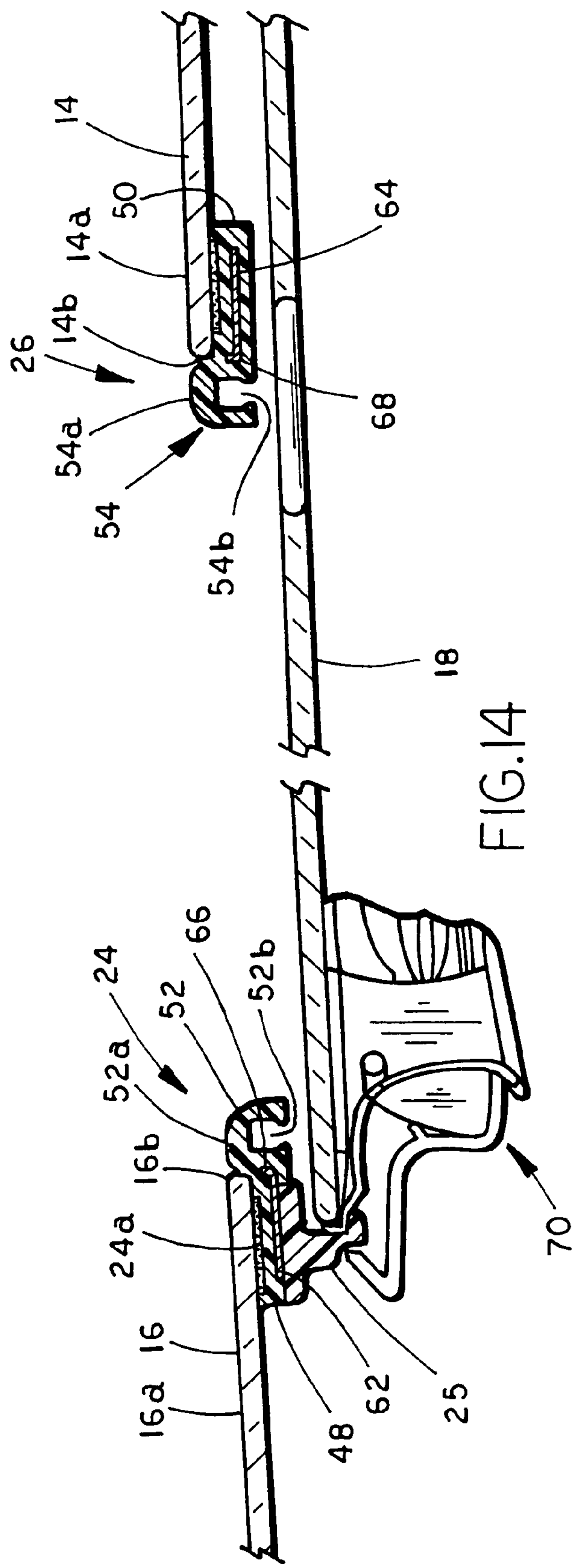
FIG. 14 is an enlarged cross-section view taken along line XIV—XIV of FIG. 1.

As best seen in FIG. 14, vertical members 24 and 26 have a rectangular cross-sectioned body 48 and 50 (respectively) and include channel-shaped portions 52 and 54. In the illustrated embodiment, vertical member 24 further includes a generally channel-shaped member 25, which is either mounted on or formed with rectangular shaped body 48, which provides a groove or channel into which sliding pane 18 moves when in its closed position. Preferably, positioned in generally channel-shaped member 25 is a seal (not shown), such as a double-L seal, a V seal, a C or U-shaped seal, a bulbous seal, or one of a number of different shaped-seals. Examples of suitable seals can be found in U.S. Pat. Nos. 6,220,650; and 6,299,235, which are incorporated by reference herein in their entireties. Fixed panes 14 and 16 are mounted on rectangular cross-sectioned bodies 48 and 50 on mounting surfaces 24*a* and 26*a*, respectively. Mounting surfaces 24*a* and 26*a* are preferably recessed to receive the adhesive for securing vertical members 24 and 26 to fixed panes 14 and 16, which is similar to the adhesive used to mount fixed panes 14 and 16 to horizontal members 20 and 22 as noted above. Furthermore, as best seen in FIG. 14, channel-shaped portions 52 and 54 abut and preferably are adhered to the inner side peripheral edges 14*b*, 16*b*, respectively, of fixed panes 14 and 16 and, further, include exterior surfaces 52*a* and 54*a* that are generally flush with the exterior surfaces 14*a* and 16*a* of fixed panes 14 and 16 and exterior surfaces 44 and 46. In addition, channel-shaped portions 52 and 54 include grooves or channels 52*b* and 54*b* for holding or supporting seals (not shown), which seal against the exterior surface of sliding pane 18. The seals may be bulbous seals, double-L seals, Y-shaped seals, or numerous other shaped seals.

Referring to FIG. 2, upper and lower horizontal members 20, 22 are spaced inwardly from the peripheral edges of fixed panes 14 and 16 so that upper and lower channel members 28 and 30 are spaced to receive the upper and lower edges of sliding pane 18, which in the illustrated embodiment has a smaller height dimension than fixed panes 14, 16. Flanges 40 and 42 extend between fixed panes 14 and 16 above and below sliding pane 18 to fill the space between fixed panes 14 and 16. Optionally, one or more exterior surface 44, 46 includes a raised peripheral portion 47 (FIG. 1) which aligns with the outer surfaces 52*a* and 54*a* of channel-shaped members 52 and 54 of vertical members 22 and 24 for styling purposes to form a framed central region 60 of window assembly 10. Alternately, outer surfaces 52*a*, 54*a*, 44 and 46 and the exterior surfaces 14*a* and 16*a* of panes 14 and 16 may all lie in the same plane.

To increase the rigidity of vertical members 24 and 26, vertical members 24 and 26 include therein, such as by encapsulation, rigid reinforcement elements, such as plate members 62 and 64, preferably metal plate members. Referring again to FIG. 14, plate members 62 and 64 include flange portions 66 and 68 which are oriented towards fixed panes 14 and 16 to provide additional stiffness to vertical members 24 and 26. As noted above, the rigid reinforcement elements provide rigidity to vertical members 24 and 26 and, further, provide a mounting surface for a catch or the like for a latch mechanism 70. Latch mechanism 70 is mounted to pane 18 by an adhesive, such as an epoxy adhesive, a silicone adhesive, a urethane adhesive, including a one-part and more preferable a two-part urethane adhesive, an acrylic adhesive, and a polyvinylbutyral adhesive, or the like, for locking sliding pane 18 in its closed position (see FIG. 2). The rigid reinforcement elements (62 and 64) extend through vertical members 24 and 26 but preferably terminate above channel-shaped members 28 and 30 to provide some local flexibility for upper and lower horizontal members to ease installation of sliding pane 18 in the upper and lower tracks formed by channel-shaped members 28 and 30. It should be understood that the reinforcement elements may be formed from other rigid materials, including a composite material, such as reinforced plastic or the like.

When sliding pane 18 is mounted in the tracks formed in upper and lower horizontal members 20 and 22, it can be appreciated that sliding pane 18 may be mounted for movement to the right or to the left as viewed in FIG. 2 given the symmetrical arrangement of support system 12, by switching vertical members 24 and 26. In addition, it can be further appreciated that two sliding panes may be incorporated into assembly 10 and supported in the respective tracks of upper and lower members 20, 22 in which case, both components of the latch mechanism may be mounted to the respective sliding panes. Examples of suitable bonding methods of latches or the like onto glass may be found, for example in U.S. Pat. Nos. 6,299,235; 5,864,966; and 6,086,138, which are incorporated by reference in their entireties.

Referring again to FIG. 2, optionally and preferably, fixed window panes 14 and 16 include a ceramic frit layer 80 (or other known coatings), which is preferably applied to the inner surfaces of fixed panes 14 and 16 along the peripheral portions thereof. The frit layer 80 is substantially opaque and functions to facilitate adhering or bonding of the support system 12 to fixed panes 14 and 16, while also improving the overall appearance of the window by providing a black-out function so that the bonding surfaces are then not visible from the exterior of the window. Further, frit layer 80 may define a viewing area through the fixed window panes that is generally commensurate in size with the viewing area through sliding pane 18. Frit layer 80 further conceals the respective fasteners 84, which are mounted by an adhesive to the inner surface of window assembly 10 for securing window assembly 10 into the body of the vehicle in which the window assembly is to be mounted. Suitable adhesives include an epoxy adhesive, a silicone adhesive, a urethane adhesive, including a one-part and more preferable a two-part urethane adhesive, an acrylic adhesive, and a polyvinylbutyral adhesive, or the like. Reference is also made to U.S. Pat. Nos. 4,364,214; 4,364,595; 6,299,255; and 6,220,650, for examples of suitable adhesives, which are incorporated by reference herein in their entireties.

As referenced above, to form support system 12, channel-shaped members 28 and 30 and reinforcing members 62 and 64 are placed in a mold cavity of a molding apparatus into which a plastic material (such as described above) is injected to at least partially (and more preferably substantially) encase/encapsulate the components. However, it should be understood that support system 12 may be formed by injecting a plastic material into a mold cavity of a molding apparatus, with the channel-shaped members 28 and 30 press-fit into the grooves formed in the upper and lower horizontal members, and with the reinforcing elements mounted or press fit into a receiving structure formed in the vertical members during molding. Preferably, channels or openings 22*b* and 30*c* are formed either during molding or otherwise formed in lower horizontal member 22 to provide a passageway for water that gets trapped in channel-shaped member 30 to flow out of window assembly 10. After support system 12 is formed, fixed panes 14 and 16 are placed on the mounting surfaces 20*a* and 22*a* of upper and lower horizontal members 20 and 22 and on mounting surfaces 24*a* and 26*a* of vertical members after an adhesive has been applied to the respective mounting surfaces. As noted above, suitable adhesives include an epoxy adhesive, a silicone adhesive, a urethane adhesive, including a one-part and more preferable a two-part urethane adhesive, an acrylic adhesive, and a polyvinylbutyral adhesive, or the like. The fixed panes (14, 16) are positioned so that the peripheral edges abut the channel-shaped portions 52 and 54 of vertical members 24 and 26 and, further, are preferably adhered at their edges to the sides of channel-shaped portions 52 and 54 by the adhesive. Sliding pane 18 is then inserted into the tracks formed in upper and horizontal members 20 and 22. In order to provide a substantially airtight/watertight seal at opening 32 when sliding pane 18 is moved to its closed position, seals are positioned in both the upper and lower tracks and, further, in the channel portions 52 and 54 of vertical members 24 and 26. The seals positioned in rails 21 and 23 and vertical members 24 and 26 may comprise an H-shaped seal, such as disclosed in U.S. pending utility application Ser. No. 09/638,433, filed Aug. 14, 2000, entitled POWER SLIDER WINDOW ASSEMBLY, now U.S. Pat. No. 6,591,552, which is incorporated herein by reference in its entirety. As described in the reference pending application, the seal preferably comprises a single seal, which may be injection molded, for example from SANTOPRENE® brand polymeric material available from Monsanto Corporation. However, the seal may be formed from other materials, including EPDM and thermoplastic elastomers. In addition, the seals may comprise a bulbous seal, a V-shaped seal, a C or U-shaped seal, or any one of a number of different shapes.

In a preferred installation, the vehicle manufacture applies an adhesive, such as an epoxy adhesive, a silicone adhesive, a urethane adhesive, including a one-part and more preferable a two-part urethane adhesive, an acrylic adhesive, and a polyvinylbutyral adhesive, or the like, to the peripheral portion of the inner surface of window assembly 10 as well as to the recessed mounting surfaces 40*a* and 42*a* of flanges 40 and 42, which in combination with fasteners 74, secure window assembly 10 to the body of the vehicle. In this manner, the fixed panes (14 and 16) are directly bonded to the vehicle body. As a result, the mounting plane of window assembly 10 is offset with respect to the centroid of the support 12. In other words, support 12 is substantially recessed within the window opening of the vehicle.

In the embodiment illustrated in FIGS. 1–14, sliding pane 18 is manually movable between its closed and open positions; however, it should be understood that assembly 10 may incorporate or cooperate with a drive system to power sliding pane 18, such as the drive system illustrated in FIGS. 15–21 described below or the drive system described in copending application entitled POWER SLIDER WINDOW ASSEMBLY, Ser. No. 09/638,433, filed Aug. 14, 2000, now U.S. Pat. No. 6,591,552, which is incorporated by reference herein in its entirety.

Figure 15:
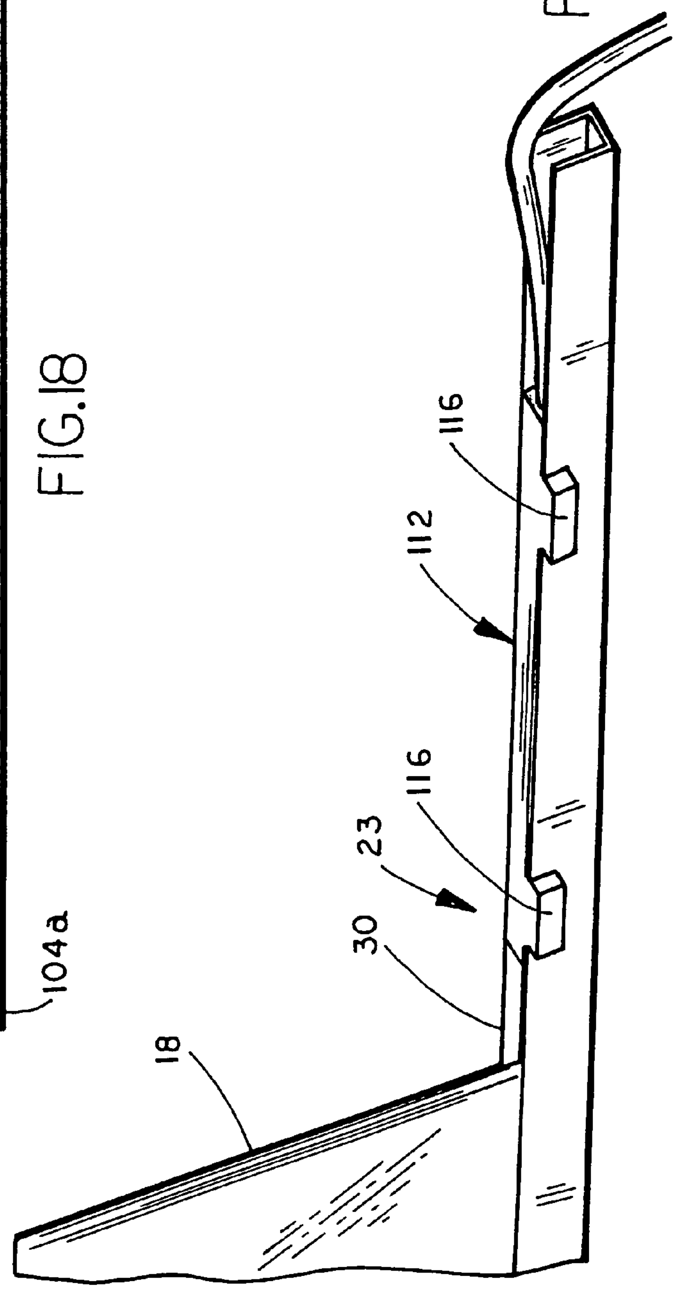
FIG. 15 is a fragmentary view of a drive assembly for the horizontal slider window assembly of the present invention.
Figure 16:
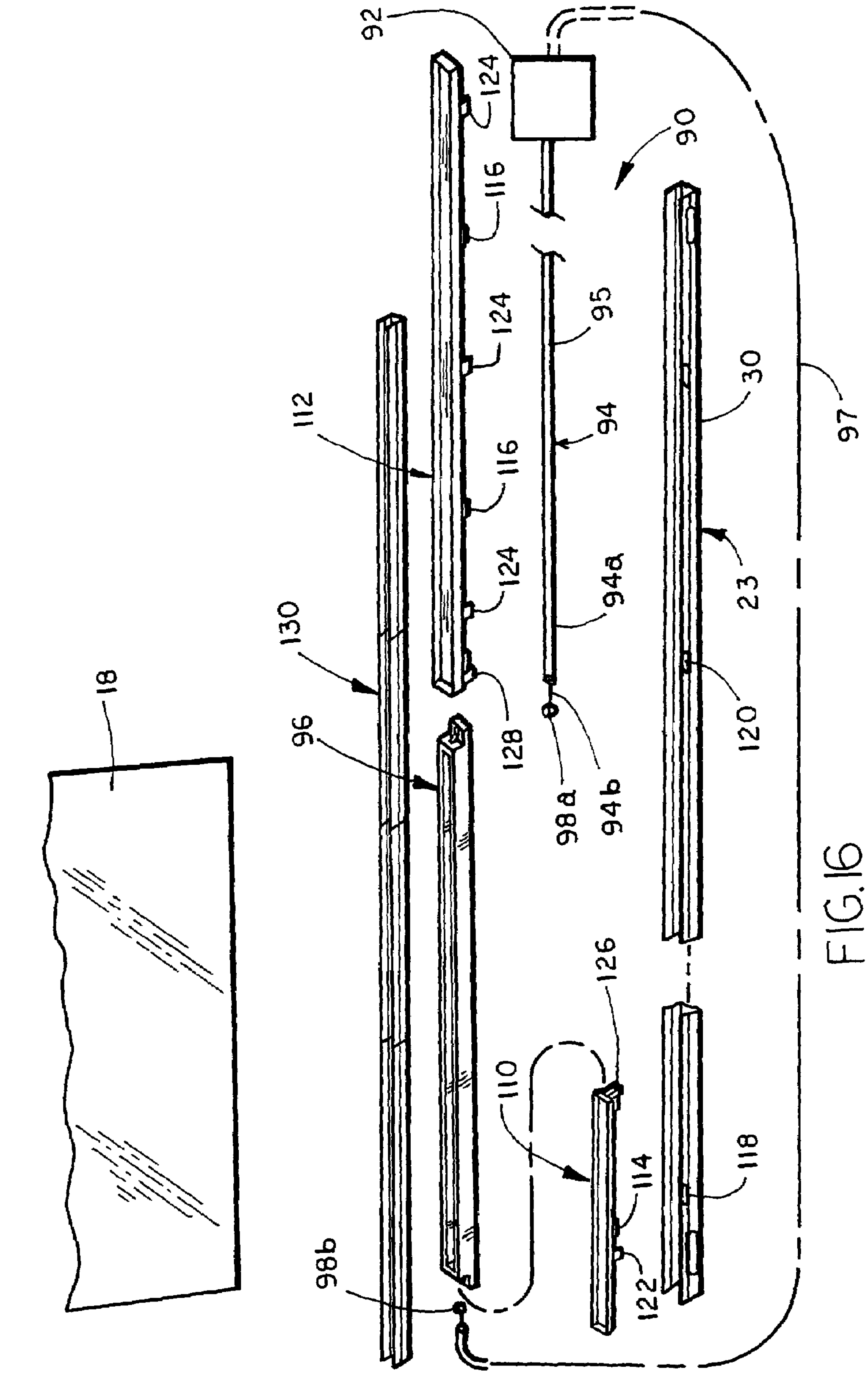
FIG. 16 is a fragmentary exploded perspective view of the driver assembly of FIG. 15.
Figure 19:
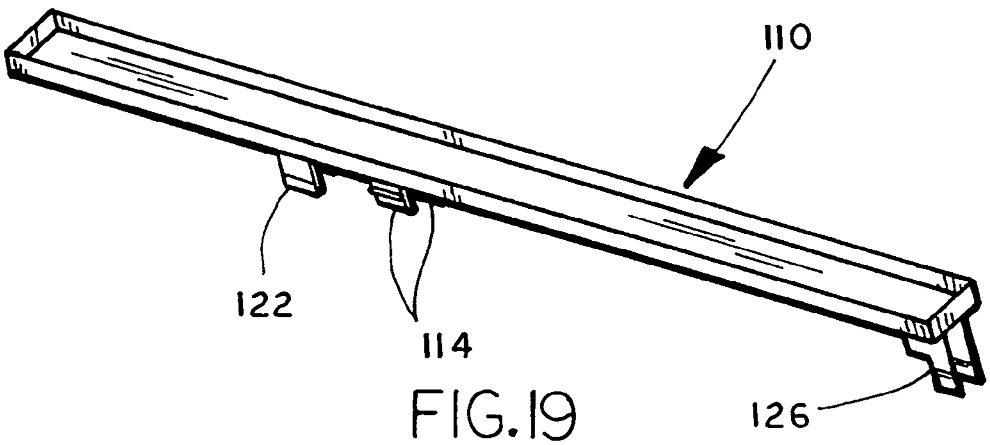
FIG. 19 is an enlarged view of the cover guide plate illustrated in FIG. 16.
Figure 20:
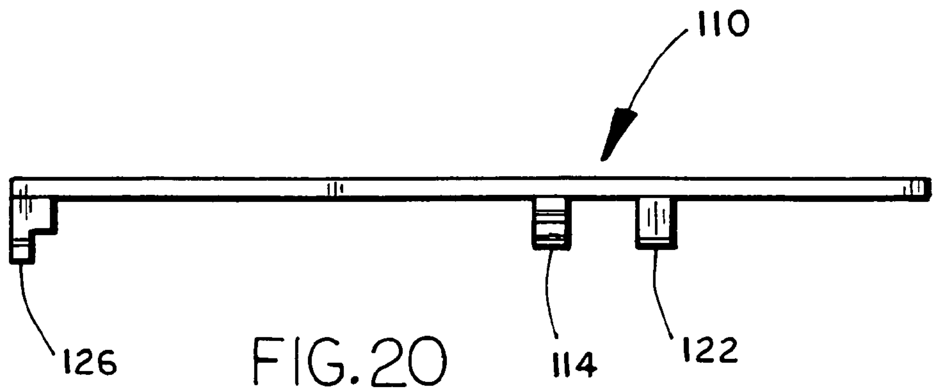
FIG. 20 is a side elevation view of the cover and guide plate of FIG. 19.
Figure 21:
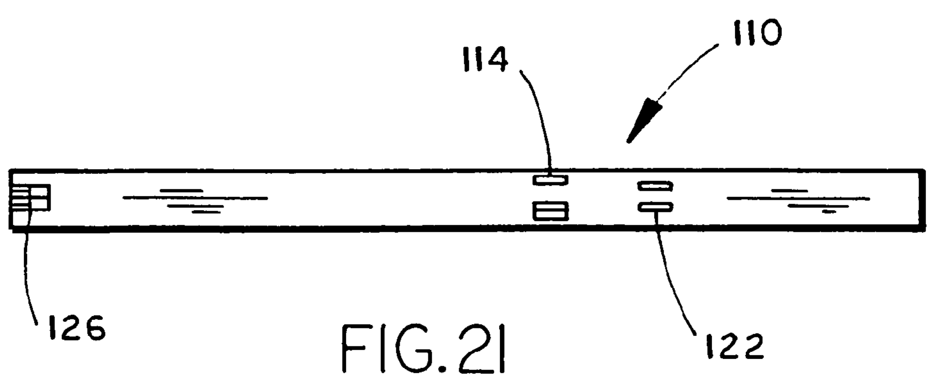
FIG. 21 is a bottom plan view of the cover and guide plate of FIG. 20.

As noted above, the sliding pane of window assembly 10 may incorporate a drive system to power the sliding pane. Referring to FIGS. 15 and 16, sliding pane 18 may be moved between its open and closed positions by drive assembly 90. Drive assembly 90 comprises a cabled-based drive assembly, which includes a cable drum and motor 92 and a cable 94. In the illustrated embodiment, sliding pane 18 is supported in track 23 by a window slider 96 in which the ends 98*a* and 98*b* of cable 94 are anchored.

Figure 17:
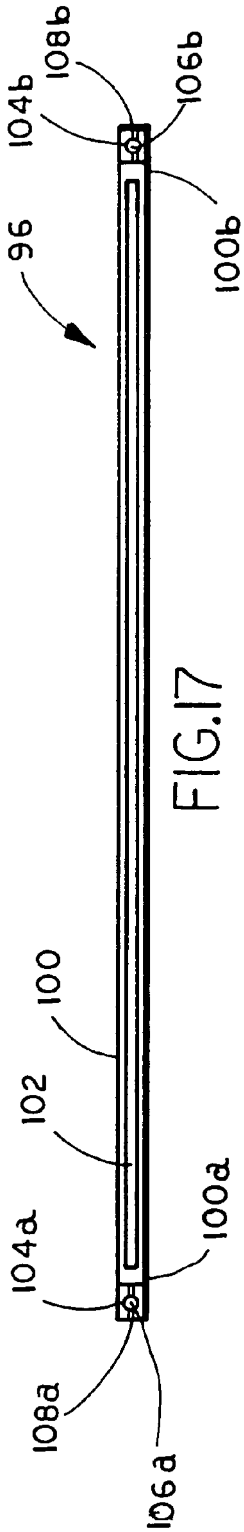
FIG. 17 is a top plan view of a window slider member of the driver assembly.
Figure 18:
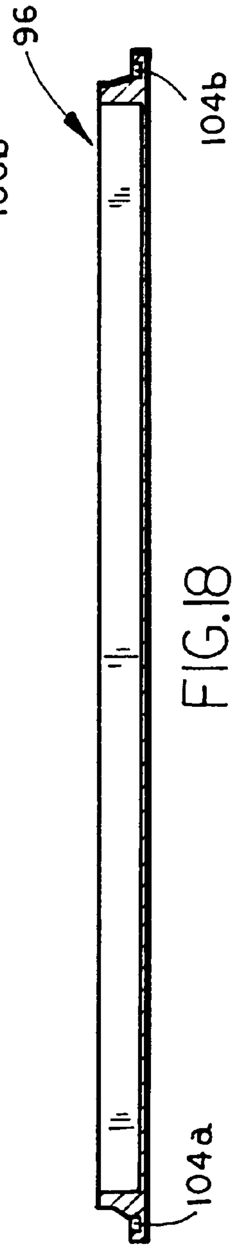
FIG. 18 is a side elevation view of the window slider member of FIG. 17.

Referring to FIGS. 17 and 18, window slider 96 comprises a generally channel-shape member 100 with closed ends 100*a* and 100*b*, which define a recess 102 in which the lower edge of sliding pane 18 is positioned. Slider 96 is preferably formed, such as by molding, from a plastic material, such as the plastic materials noted above; however, it should be understood that slider may be made from a composite material, such as reinforced plastic, or a metal, such as aluminum. Though not illustrated, recess 102 optionally and preferably includes a seal for sealing the lower edge of sliding pane 18. Furthermore, the seal may include one or more ribs to center pane 18 and slider 96 in the groove or channel of member 30.

As best understood from FIGS. 17 and 18, distal ends 104*a* and 104*b* of slider 96 comprise projecting flanges, which include slotted openings 108*a*, 108*b* (FIG. 17) that communicate with enlarged openings 106*a* and 106*b* (FIG. 17). Enlarged openings 106*a* and 106*b* receive the enlarged ends 98*a* and 98*b* of cable 94 with the wire 94*b* of cable 94 passing through openings 108*a* and 108*b* to thereby anchor the ends of the cable to both ends of the window slider (96).

In order to maintain cable 94 in the groove or channel of channel-shape member 30, window assembly 10 includes covers 110 and 112, which include downwardly depending tabs 114 and 116, respectively, that engage and cooperate with corresponding recesses 118 and 120 provided on the sides of channel-shape member 30. Preferably tabs 114 and 116 provide a snap-fit mounting of covers 110 and 112 to member 30.

It should be understood that covers 110 and 112 extend up to the edge of the range of travel of sliding pane 18 so as to not interfere with the movement of sliding pane 18 in channel-shaped member 30. In addition, covers 110 and 112 optionally include downwardly depending guide flanges or tabs 122 and 124 (FIGS. 19–21), respectively, which hold the cable in channel-shaped member 30 and, further, define a linear path for the cable through channel-shaped member 30. In addition, covers 110 and 112 include cable sheath termination members or blocks 126 and 128, which anchor the outer sheath or cover 94*a* of the cable 94 while permitting the wire 94*b* of the cable to pass through and extend and couple to window slider 96, as described above. Optionally and preferably positioned in channel-shape member 30 is a U-shape seal 130 which receives window slider 96 therein. Seal 130 preferably comprises an elastomeric seal, such as an EPDM or SANTOPRENE® seal and, furthermore, is preferably slip coated to reduce the wear on the seal and also the drive mechanisms of drive assembly 90.

As would be understood by those skilled in the art, when motor and drum 92 are actuated to pull on cable section 95 of cable 94, sliding pane 18 will move to the right as viewed in FIG. 16. In addition, while cable section 95 is pulled by motor and drum 92, cable section 97 will be extended. In the same manner, when motor and cable drum 92 pull on cable section 97, sliding pane 18 will be moved to the left (as viewed in FIG. 16).

As can be appreciated from FIG. 2, given the open design and mounting arrangement of support 12, cable 94 may exit support 12 through the open end of lower horizontal member 22 and, thereafter, bend over a relatively large radius path to extend behind the vehicle body panel to the motor and drum (92) which is preferably mounted below window assembly 10. Because the lower track of support 12 is offset from the mounting plane of window assembly 12, when cable 94 exits lower horizontal member 22, the path of cable 94 can at least initially remain in the same plane. In this manner, the path of the cable has no tight turns or bends, or convoluted paths, so that the cable (94) will not be subjected to excess bending when following its path from the motor and cable drum to the lower track. As a result, the amount of bending and twisting of cable 94 is significantly reduced over prior art window assemblies.

It can be appreciated from the foregoing that window assembly 10 incorporates a simplified support system that is easier and less costly to manufacture. Furthermore, the support system integrates and provides sufficient rigidity to the components of the window assembly to form a window assembly unit that is lighter and relatively easy to install, thus, further reducing the costs of the installed window assembly.

While several forms of the invention have been shown and described, other forms will now be apparent to those skilled in the art. For example, any of the components forming the support may be formed by the rolltrusion method noted in reference to member 30. This method cuts assembly time and hence costs. In addition, though illustrated as a while the location of the window opening is illustrated as being centrally located, the opening may be offset. In addition, window assembly 10 may incorporate other features not specifically mentioned in this application. For example, window assembly 10 may incorporate post-attached structures, such as described in U.S. Pat. Nos. 5,352,010 and 5,451,090, which are incorporated by reference in their entireties, and accessories, such as storage compartments or the like mounted thereto, such as disclosed in U.S. Pat. No. 6,231,111, which is incorporated by reference herein in its entirety. In addition, window assembly 10 may incorporate lights, such as interior map lights or the like, or lights that direct exteriorly of the vehicle, such as brake lights (chimsel lights), turn signals, or the like, which may be incorporated into flanges 40 or 42 or may be directly bonded to the fixed panes, such as by an epoxy adhesive, a silicone adhesive, a urethane adhesive, including a one-part and more preferable a two-part urethane adhesive, an acrylic adhesive, and a polyvinylbutyral adhesive, or the like. Therefore, it will be understood that the embodiments shown in the drawings and described above are merely for illustrative purposes, and are not intended to limit the scope of the invention which is defined by the claims that follow as interpreted under the principles of patent law including the doctrine of equivalents.

We claims:

1. A vehicular rear window assembly for a vehicle comprising:

a first fixed window pane having a perimeter edge with upper, lower, outer, and inner perimeter portions;

a second fixed window pane having a perimeter edge with upper, lower, outer, and inner perimeter portions, said fixed panes each having an outwardly facing side and an inwardly facing side for facing inwardly in the vehicle when the window assembly is mounted in the vehicle;

a sliding window pane; and a support system mounted to said inwardly facing sides of said fixed panes inwardly of said outer perimeter portions of said fixed panes, said support system comprising:

an upper horizontal member, a lower horizontal member, and a pair of spaced apart vertical members, said vertical members interconnecting said upper horizontal member and said lower horizontal member, said upper and lower horizontal members being structurally and rigidly interconnected only by said fixed panes and said vertical members, each of said upper and lower horizontal members having opposed first and second ends, said vertical members interconnecting said upper horizontal member and said lower horizontal member at locations of said upper horizontal member and said lower horizontal member inboard and distant from said first and second ends of said upper and lower horizontal members, said fixed panes spaced apart wherein their inner perimeter portions in combination with said horizontal members define an opening, said upper and lower horizontal members directly attached only to said inwardly facing sides of said fixed panes and being attached to said inwardly facing sides of said fixed panes by an adhesive, said vertical members having exposed exterior surfaces substantially coplanar with exterior surfaces of the outwardly facing sides of said fixed panes, said exterior surfaces of said outwardly facing sides adjacent said inner perimeter portions of said fixed panes being free of adhesive, and said sliding pane being supported for horizontal movement in said upper and lower horizontal members between open and closed positions with respect to said opening by said support system.

2. The window assembly according to claim 1, wherein said upper horizontal member has an upper track, said lower horizontal member having a lower track, and said sliding pane being movable between said open and closed positions in said upper and lower tracks.

3. The window assembly according to claim 1, wherein said sliding pane is manually slidable between said open and closed positions.

4. The window assembly according to claim 3, wherein at least one of said vertical members includes a reinforcement member at least partially encapsulated in a polymeric material of said at least one of said vertical members.

5. The window assembly according to claim 1, wherein said upper and lower horizontal members and said vertical members comprise a generally H-shaped support element.

6. The window assembly according to claim 5, wherein said support element comprises a molded plastic support element.

7. The window assembly according to claim 5, wherein at least one or said upper and lower horizontal members includes a channel-shaped member at least partially encapsulated in a polymeric material of said at least one of said upper and lower horizontal members for defining a track for said sliding pane.

8. The window assembly according to claim 5, wherein each of said upper and lower horizontal members includes a channel-shaped member at least partially encapsulated in a polymeric material of said horizontal member for defining upper and lower tracks, respectively.

9. The window assembly according to claim 1, wherein at least one of said upper and lower horizontal members includes an extended flange, said extended flange extending either above or below said sliding pane and between said fixed panes.

10. The window assembly according to claim 9, wherein said extended flange includes a raised peripheral portion, and said raised peripheral portion of said extended flange aligning with said exterior surfaces of said vertical members to thereby form a framed central portion.

11. The window assembly according to claim 10, wherein said framed central portion includes said opening.

12. The window assembly according to claim 1, wherein each of said upper and lower horizontal members has an extended flange of each, said extended flanges extending one of above and below said sliding pane and between said fixed panes to thereby form a generally flush window assembly.

13. The window assembly according to claim 1, wherein at least one of said upper and lower horizontal members is spaced inwardly from said upper and lower perimeter portions of said perimeter edges of said fixed panes.

14. The window assembly according to claim 1, wherein each of said upper and lower horizontal members is spaced inwardly from upper and lower perimeter portions of said perimeter edges of said fixed panes.

15. A vehicular rear window assembly for a vehicle comprising:

a first fixed window pane having an exterior surface and an inwardly facing surface when said window assembly is mounted in the vehicle;

a second fixed window pane having an exterior surface and an inwardly facing surface when said window assembly is mounted in the vehicle;

a sliding window pane; and a support system comprising:

a plastic support element including an upper horizontal member, a lower horizontal member, and a pair of spaced apart vertical members, each of said horizontal members including an end portion, said vertical members interconnecting said upper horizontal member and said lower horizontal member inwardly of and distant from said end portions, said vertical members and said horizontal members defining an opening therebetween, said inwardly facing surfaces of said fixed panes mounted to said upper and lower horizontal members by an adhesive, said upper and lower horizontal members only being structurally and rigidly interconnected by said fixed panes and said vertical members, said vertical members having exposed exterior surfaces substantially coplanar with said exterior surfaces of said fixed panes and are free of an adhesive, at least one of said upper horizontal member and said lower horizontal member having a track encapsulated therein for guiding said sliding pane between open and closed positions with respect to said opening.

16. The window assembly according to claim 15, wherein said sliding pane is manually slidable between said open and closed positions.

17. The window assembly according to claim 15, wherein said track comprises a channel-shaped member.

18. The window assembly according to claim 17, wherein said channel-shaped member comprises a metal channel-shaped member.

19. The window assembly according to claim 15, wherein each of said panes include interior surfaces when said window assembly is mounted in a vehicle, said inwardly facing surfaces of said fixed panes having upper, lower, and outer side peripheral portions, said outer side peripheral portions and said exterior surfaces of said fixed panes being substantially free of said horizontal member adhesive.

20. The window assembly according to claim 19, wherein at least one of said upper and lower horizontal members includes an extended flange, said extended flange extending above or below said sliding pane and between said fixed panes to thereby form a generally flush window assembly.

21. The window assembly according to claim 15, wherein each of said upper and lower horizontal members includes an extended flange.

22. The window assembly according to claim 21, wherein at least one of said extended flanges includes a raised peripheral portion, and said raised peripheral portion aligning with said exterior surfaces of said vertical members to thereby form a portion of a framed central portion.

23. The window assembly according to claim 22, wherein said framed central portion includes said opening.

24. The window assembly according to claim 15, wherein at least one of said upper and lower horizontal members is spaced inwardly from upper and lower peripheral edges of said fixed panes.

25. The window assembly according to claim 15, wherein at least one of said end portions of said upper and lower horizontal members is spaced inwardly from side peripheral edges of said fixed panes.

26. The window assembly according to claim 15, wherein said opening comprises a central opening.

* * * * *

UNITED STATES PATENT AND TRADEMARK OFFICE

CERTIFICATE OF CORRECTION

PATENT NO. : 7,003,916 B2 
APPLICATION NO. : 10/113056
DATED : April 1, 2002
INVENTOR(S) : David E. Nestell et al.

It is certified that error appears in the above-identified patent and that said Letters Patent is hereby corrected as shown below:

Column 11:
Line 12, Claim 7, “or” should be --of--.
Line 36, Claim 12, “flange of each,” should be --flange, each of--.

Signed and Sealed this

Sixth Day of February, 2007

JON W. DUDAS
*Director of the United States Patent and Trademark Office*

UNITED STATES PATENT AND TRADEMARK OFFICE

CERTIFICATE OF CORRECTION

PATENT NO. : 7,003,916 B2
APPLICATION NO. : 10/113056
DATED : February 28, 2006
INVENTOR(S) : David E. Nestell et al.

It is certified that error appears in the above-identified patent and that said Letters Patent is hereby corrected as shown below:

Column 11:
Line 12, Claim 7, “or” should be --of--.
Line 36, Claim 12, “flange of each,” should be --flange, each of--.

This certificate supersedes Certificate of Correction issued February 6, 2007.

Signed and Sealed this

Sixth Day of March, 2007

JON W. DUDAS
*Director of the United States Patent and Trademark Office*